(12) United States Patent
Vest

(10) Patent No.: US 9,017,018 B2
(45) Date of Patent: Apr. 28, 2015

(54) ANNULAR SEAL

(75) Inventor: Wade Alan Vest, Jamestown, IN (US)

(73) Assignee: Rolls-Royce Corporation, Indianapolis, IN (US)

(\*) Notice: Subject to any disclaimer, the term of this patent is extended or adjusted under 35 U.S.C. 154(b) by 869 days.

(21) Appl. No.: 12/565,942

(22) Filed: Sep. 24, 2009

(65) Prior Publication Data

US 2011/0070079 A1 Mar. 24, 2011

(51) Int. Cl.
*F01D 11/08* (2006.01)
*F16J 15/08* (2006.01)
*F01D 11/00* (2006.01)

(52) U.S. Cl.
CPC ........... *F16J 15/0887* (2013.01); *F01D 11/005* (2013.01)

(58) Field of Classification Search
CPC ......... F01D 5/20; F01D 11/005; F01D 11/08; F01D 11/12; F01D 11/127; F01D 11/20
USPC .......... 415/173.1, 173.2, 173.3, 173.6, 173.7, 415/174.2; 277/411–413, 543, 545
See application file for complete search history.

(56) References Cited

U.S. PATENT DOCUMENTS

| | | | |
|---|---|---|---|
| 2,326,489 A | 8/1943 | Payne | |
| 3,114,561 A * | 12/1963 | Creath et al. | 277/555 |
| 3,301,568 A | 1/1967 | Perry | |
| 3,837,631 A | 9/1974 | Evans et al. | |
| 4,133,542 A | 1/1979 | Janian et al. | |
| 4,508,356 A * | 4/1985 | Janian | 277/555 |
| 4,585,239 A * | 4/1986 | Nicholson | 277/555 |
| 5,100,158 A * | 3/1992 | Gardner | 277/411 |
| 5,370,402 A * | 12/1994 | Gardner et al. | 277/411 |
| 5,630,591 A | 5/1997 | Drijver et al. | |
| 5,632,493 A * | 5/1997 | Gardner | 277/411 |
| 5,799,953 A | 9/1998 | Henderson | |
| 5,813,674 A | 9/1998 | Dickie et al. | |
| 6,419,236 B1 | 7/2002 | Janian | |
| 6,688,604 B2 | 2/2004 | Hashimoto | |
| 7,159,857 B2 | 1/2007 | Janian | |
| 7,384,494 B2 * | 6/2008 | Kosty et al. | 156/211 |
| 7,464,940 B2 * | 12/2008 | Datta | 277/555 |
| 7,469,906 B2 | 12/2008 | Peet et al. | |
| 2007/0296158 A1 * | 12/2007 | Datta | 277/411 |

\* cited by examiner

*Primary Examiner* — Ned Landrum
*Assistant Examiner* — Su Htay
(74) *Attorney, Agent, or Firm* — Krieg DeVault LLP

(57) ABSTRACT

An annular seal positionable in a gap is disclosed herein. The annular seal includes a plurality of leaves positioned about a center axis. Each leaf extends to a distal end that is elastically deflectable relative to the center axis to accommodate changes in a size of the gap. The annular seal also includes a ring encircling the center axis and at least partially interconnecting the plurality of leaves together for concurrent installation and removal. The annular seal also includes a plurality of tabs projecting from the ring along the center axis. Each of the tabs is directly connected to at least one of the plurality of leaves such that elastic deformation of one of the plurality of leaves induces bending in the corresponding tab before inducing bending in the ring.

4 Claims, 4 Drawing Sheets

ANNULAR SEAL

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of N0019-04-C-0093 awarded by the Department of Defense.

BACKGROUND OF THE INVENTION

1. Field of the Invention

The invention relates to an annular seal positionable in a gap that can vary in size.

2. Description of Related Prior Art

In certain operating environments, two adjacent structures can be spaced from another and can change size at different rates. This condition can result in a gap between the structures that varies in size. Spring seals are a known approach to sealing such a gap. Spring seals can also be referred to as seal rings and can take many forms. For example, U.S. Pat. No. 6,419,236 discloses a seal ring which includes a spiral spring wire acting as an expander device that can be inserted inside a C and or U shaped jacket made of a softer material such as an elastomer. The spiral spring wire forces the outer and inner lips of the jacket outwardly and inwardly to create a seal.

SUMMARY OF THE INVENTION

In summary, the invention is an annular seal positionable in a gap. The annular seal includes a plurality of leaves positioned about a center axis. Each leaf extends to a distal end that is elastically deflectable relative to the center axis to accommodate changes in a size of the gap. The annular seal also includes a ring encircling the center axis and at least partially interconnecting the plurality of leaves together for concurrent installation and removal. The annular seal also includes a plurality of tabs projecting from the ring along the center axis. Each of the tabs is directly connected to at least one of the plurality of leaves such that elastic deformation of one of the plurality of leaves induces bending in the corresponding tab before inducing bending in the ring.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

The invention, as exemplified in the embodiment described below, can be applied to seal gaps in operating environments in which the gap changes in size. Embodiments of the invention can be formed to withstand high temperature environments in which changes in the size of the gap previously resulted in cracks in prior seals. The embodiments include leaves that extend from a ring-like structure. The leaves are operable to flex and deflect without having to overcome the stiffness inherent in the ring. The leaves can be individually mounted on tabs extending from the ring so that loading arising from deflection of the leaves is primarily borne by the tabs. The tabs can be more easily deformed (elastically) in response to deflection of the leaves than the ring. It is noted that the benefits articulated herein are not exhaustive, other benefits may be perceived in the practice of one or more of the exemplary embodiments or in the practice of alternative embodiments of the invention. The benefits associated with the exemplary embodiment and described herein are not limitations of the broader invention, but rather demonstrate industrial applicability of the invention through the exemplary embodiments.

Figure 1:
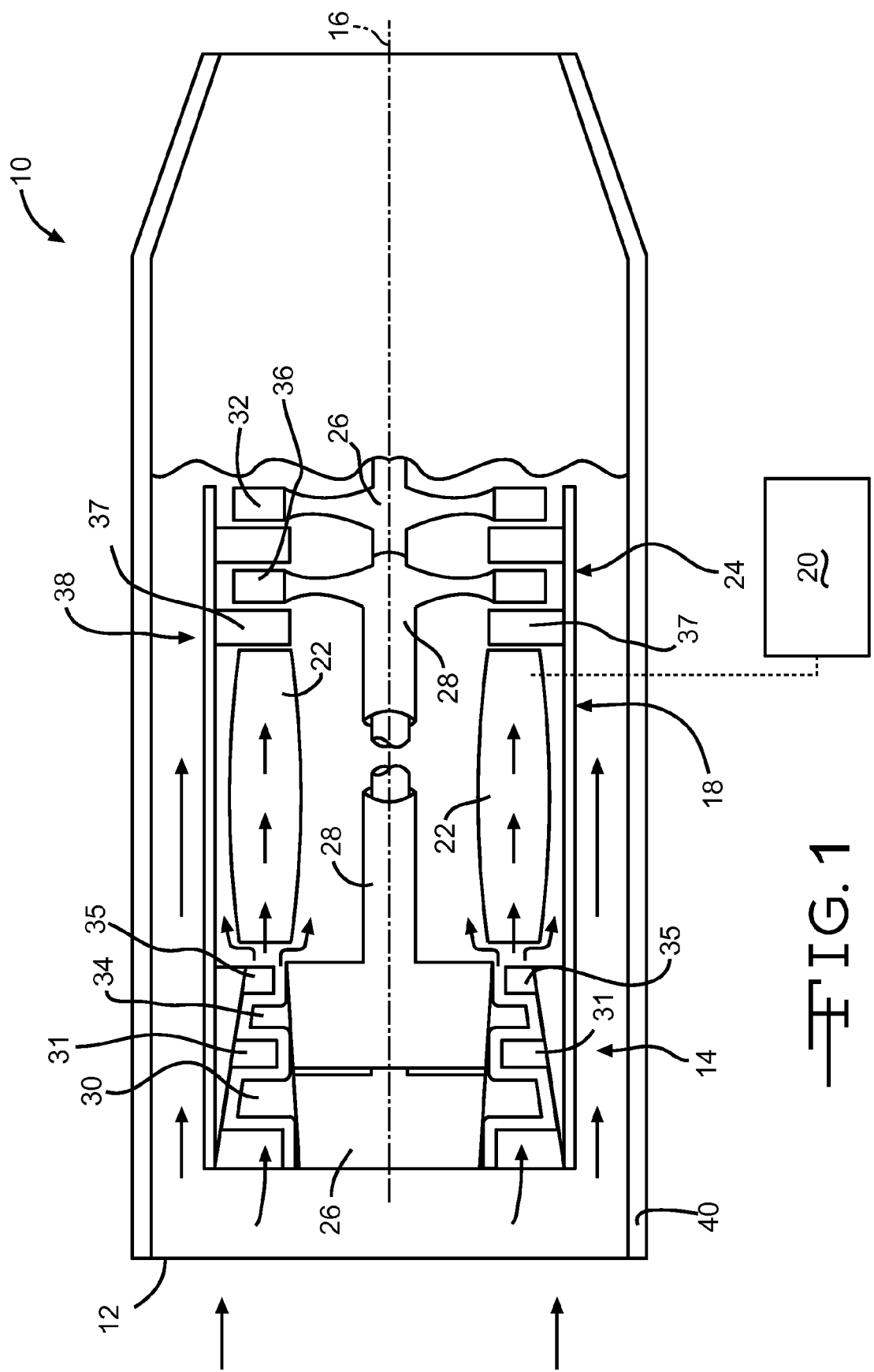
FIG. 1 is a schematic view of a turbine engine which incorporates an exemplary embodiment of the invention.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of turbine engine and in any application other than turbine engines in which a sealing for a gap operable to change size is desired or required.

The exemplary turbine engine 10 can include an inlet 12 to receive fluid such as air. The turbine engine 10 can include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. A plurality of vanes 31 can be positioned to direct fluid downstream of the blades 30. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. A plurality of vanes 35 can be positioned to receive fluid from the blades 34. The shaft 28 can also support high pressure turbine blades 36 of a high pressure portion of the turbine section 24. A plurality of vanes 37 can be positioned to direct combustion gases over the blades 36.

The compressor section 14 can define a multi-stage compressor, as shown schematically in FIG. 1. A "stage" of the compressor section 14 can be defined as a pair of axially adjacent blades and vanes. For example, the vanes 31 and the blades 30 can define a first stage of the compressor section 14. The vanes 35 and the blades 34 can define a second stage of the compressor section 14. The invention can be practiced with a compressor having any number of stages.

A casing 38 defines a first wall and can be positioned to surround at least some of the components of the turbine engine 10. The exemplary casing 38 can encircle the compressor section 14, the combustor section 18, and the turbine section 24. In alternative embodiments of the invention, the casing 38 may encircle less than all of the compressor section 14, the combustor section 18, and the turbine section 24. An outer casing 40 defines a second wall and is spaced radially outward of the casing 38.

Figure 2:
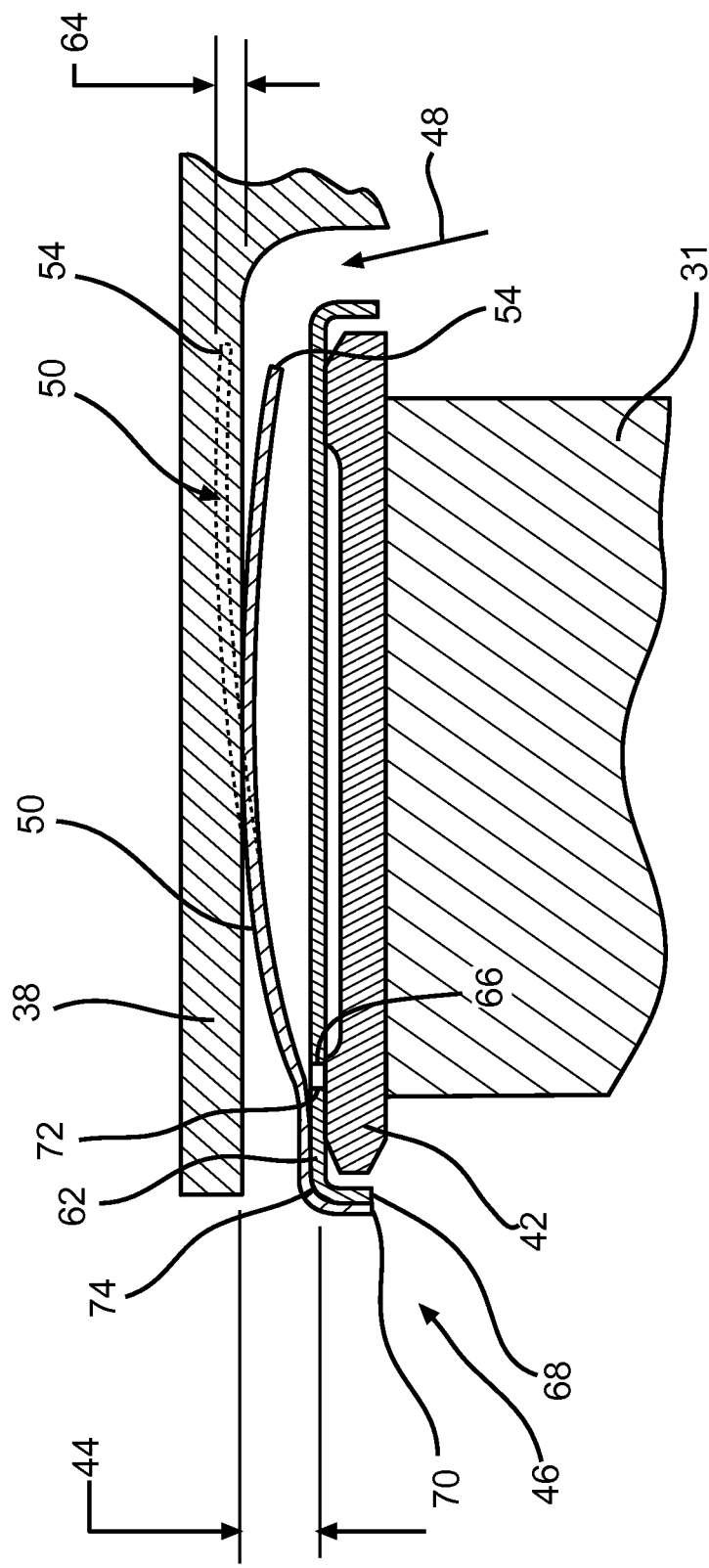
FIG. 2 is a detailed cross-sectional view of a portion of the turbine engine shown schematically in FIG. 1.

FIG. 2 is a detailed cross-sectional view of a portion of the turbine engine 10 shown schematically in FIG. 1. In FIG. 2, the vane 31 is shown mounted to a casing 42. The casing 42 can be mounted to another structure (not shown) and be fixed along the centerline axis 16 (shown in FIG. 1). The casings 38 and 42 define annular walls. A gap 44 can be defined between the casings 38 and 42. An annular seal 46 can be positioned in the gap 44 to substantially prevent fluid, referenced by arrow 48, from passing around the vane 31. It is noted that alternative embodiments of the invention can be practiced in gaps at other locations in a turbine engine and in gaps in other operating environments. Embodiments of the invention can be practiced in environments wherein the gap is radial (such as shown in FIG. 2) and in environments wherein the gap is axial.

Figure 3:
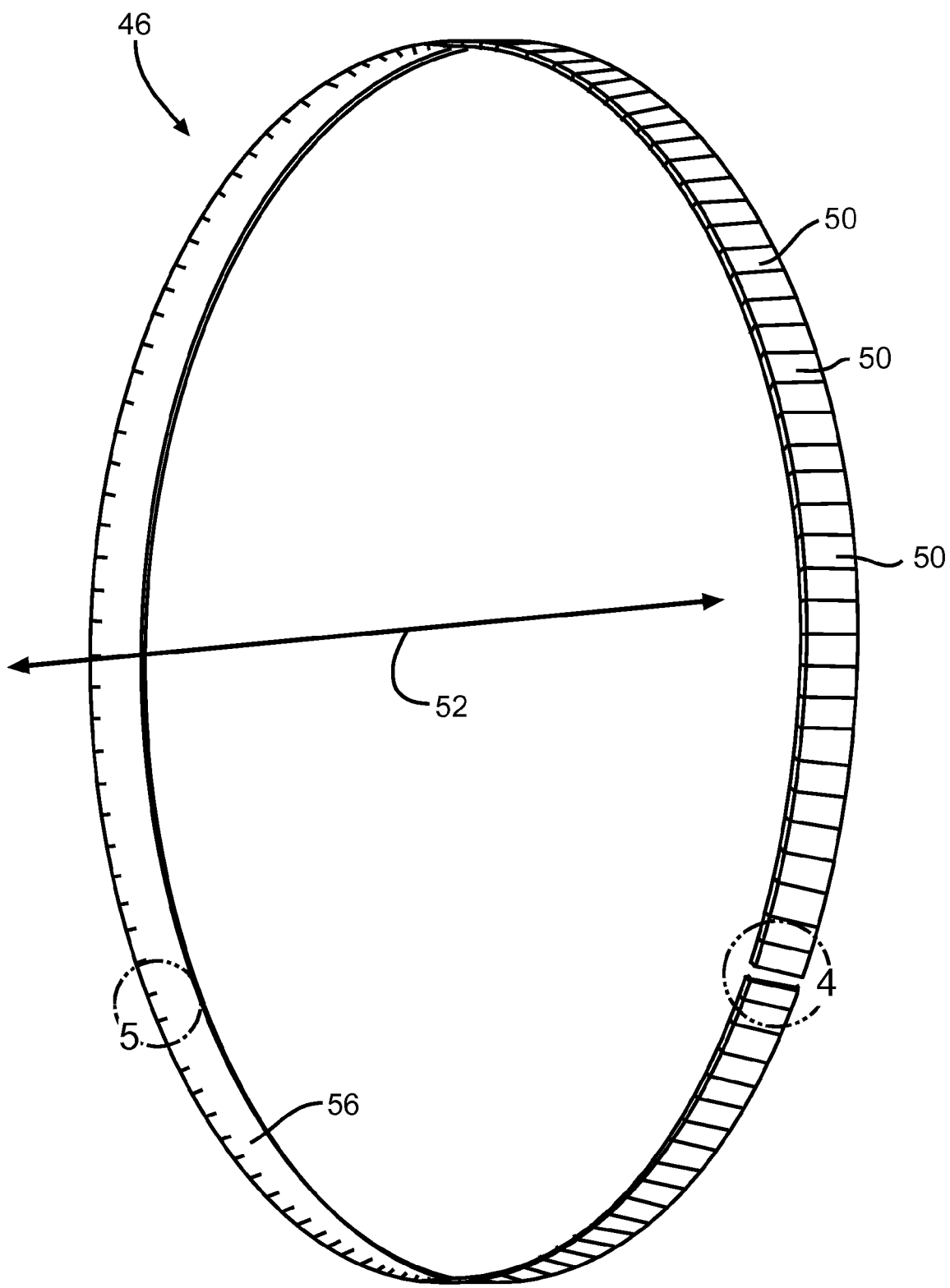
FIG. 3 is a perspective view of the exemplary embodiment of the invention.

Referring now to FIGS. 2 and 3, the annular seal 46 includes a plurality of leaves 50 positioned about a center axis 52. In the exemplary embodiment, the center axis 52 can be coaxial with the centerline axis 16 (shown in FIG. 1). Each leaf 50 extends to a distal end 54 that is elastically deflectable relative to the center axis 52 to accommodate changes in a size of the gap 44. FIG. 2 shows a leaf 50 in a deflected condition in solid line and the leaf 50 in an un-deflected or static condition in phantom. The leaf 50 deflects a radial distance referenced at 64.

Figure 4:
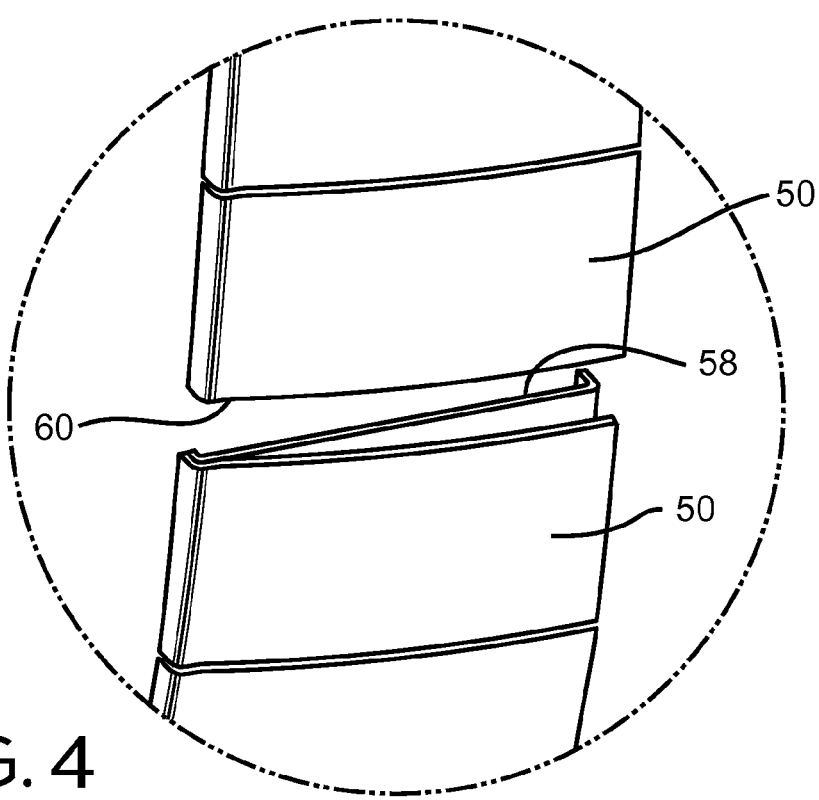
FIG. 4 is the magnified portion of FIG. 3 encircled by reference line 4.

The annular seal 46 also includes a ring 56 encircling the center axis 52. The ring 56 at least partially interconnects the plurality of leaves 50 together for concurrent installation and removal, as will be discussed in greater detail below. The ring 56 can be continuous or discontinuous. The exemplary ring 56 can extend between first and second ends 58, 60 shown in FIG. 4 abutting one another. Forming the ring 56 with first and second ends 58, 60 can ease assembly of the annular seal 46 to another structure. The ring 56 can have a constant cross-section about the axis 52 or a cross-section that varies about the center axis 52.

The annular seal 46 also includes a plurality of tabs 62 projecting from the ring 56 along the center axis 52. Each of the tabs 62 is directly connected to at least one of the plurality of leaves 50. Thus the ring 56 at least partially interconnects the plurality of leaves 50 since each leaf 50 is connected to a tab 62 and each tab 62 is connected to ring 56.

Each of the tabs 62 is connected to at least one of the plurality of leaves 50 such that elastic deformation of one of the plurality of leaves 50 induces bending in the corresponding tab 62 before inducing bending in the ring 56. The plane of bending, or centerline of bending, can be at the intersection between the tab 62 and the ring 56. The tab 62 has a circumferential width about the axis 52 less than the ring 56 and bending can occur in a relatively narrow plane of the tab 62 before the relatively wider plane of the ring 56.

Alternatively, the bending can be centered at an intermediate position along the length of the tab 62. It is noted that bending of the tab 62 or bending of the tab relative to the ring 56 may not occur in all operating environments and/or in all embodiments. The elastic deformation of a leaf 50 may only apply a load on the mating tab 62 without causing bending. However, the leaves 50 and tabs 62 and ring 56 are arranged such that if elastic deformation of a leaf 50 does induce bending, the bending would occur in the tab 62 before occurring in the ring 56. Thus, embodiments can be arranged to be operable to mechanically isolate the leaves 50 from one another such that elastic deformation of one leaf 50 will not induce stress in another leaf 50. Embodiments can also be arranged to be operable to mechanically isolate the leaves 50 from the ring 56. Thus, the stiffness of the ring 56 will not substantially impair the capacity of the leaves 50 to deflect.

Figure 5:
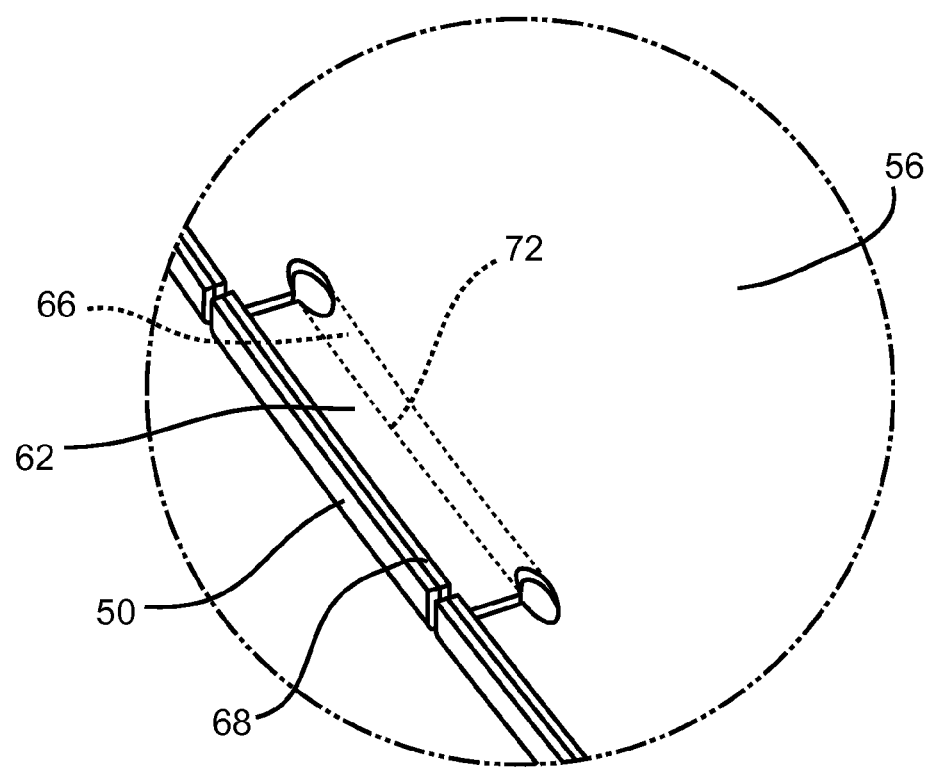
FIG. 5 is the magnified portion of FIG. 3 encircled by reference line 5.

As best shown in FIG. 5, each of the plurality of tabs 62 can extend a length along the center axis 52 (shown best in FIG. 3) between a base end 66 adjacent to the ring 56 and a distal end 68 spaced from the base end 66. The leaves 50 can be fixed to tabs 62 along less than all of the length of the tabs. For example, as shown in FIG. 2, the leaf 50 can extend between the distal end 54 and a second end 70. The leaf can be bonded to the tab 62 from the distal end 68 of the tab 62 to a position referenced at 72. The position 72 is also shown in phantom in FIG. 5. By fixing the leaf 50 to the tab 62 along less than the full length of the tab 62, the tab 62 can bear any load arising from deflection of the leaf 50 without imparting stress to ring 56. Also, if the load is imparted to the tab 62, the circumferential stiffness of the ring 56 will be less likely to inhibit deflection of the leaf 50.

The length of the tab 62 between a base end 66 and the distal end 68 can include a first distance along the center axis 52 and a second distance at least partially radial relative to the center axis 52. In the exemplary embodiment, the tab 62 includes a first distance along the center axis 52 extending between the base end 66 and a corner 74, shown in FIG. 2. The exemplary tab 62 also includes a second distance extending from the corner 74 to the distal end 68. The exemplary second distance extends perpendicular to the center axis 52 (shown best in FIG. 3) and is therefore fully radial. However, in alternative embodiments, the second distance could be only partially radial, such as oblique or slanted relative to the center axis 52. Forming the tab 62 to include first and second distances as described above can be desirable to increase the stiffness of the tab 62 and resist bending. In the exemplary embodiment of the invention, the leaf 50 is fixed to the tab 62 along at least part of the first distance and along the second distance. This arrangement can be applied in various embodiments of the invention to manipulate stiffness of the combined leaf 50 and tab 62.

The exemplary leaf 50 can be fixed to the tab 62 along less than all of the first distance. This arrangement increases the likelihood that is deflection of the leaf 50 induces a bending load wherein bending would first occur in the tab 62. The capacity of the leaf 50 to deflect is not compromised by the radial stiffness of the ring 56. In the exemplary embodiment, a load tending to induce bending would be applied such that the distal end 68 may be induced to bend upward (based on the perspective of FIG. 2) about the position 72. It is again noted that loading on the tab 62 by deflection of the leaf 50 may not be large enough to induce bending, however the loading on the tab 62 arising from deflection of the leaf 50 would induce bending in the tab 62 before inducing in the ring 56.

The exemplary leaves 50 can be partially arcuate and partially straight in a cross-sectional plane containing the center axis 52. This plane is shown in FIG. 2. The form of the leaves 50 can be selected to manipulate the leaves' 50 response to deflection. For example, the exemplary leaf 50 can be more rigid and resistance to deflection by being partially arcuate and partially straight rather than being straight. The leaves 50 can have different levels of stiffness if desired. The shape of the leaves 50 can also be selected to cause bending to occur at a precise position along the length of the leaves 50. For example, the shape of the exemplary leaf 50 results in the leaf 50 tending to bend at the position referenced at 72. Alternative embodiments of the invention can be practiced wherein one or more leaves 50 bend at a position different than the position referenced at 72. Further, different leaves 50 may bend at positions different from one another.

The exemplary leaves 50 can be concave toward the ring 56 in the cross-sectional plane containing the center axis 52. The exemplary ring 56 can be flat in the cross-sectional plane. The ring 56 and the plurality of tabs 62 can directly contact and extend flush against the first wall defined by the casing 42. The plurality of leaves 50 can be spaced from the first wall and can directly contact the second annular wall defined by the casing 38. The exemplary leaf 50, tab 62, and the ring 56 define a substantially wishbone arrangement in the cross-sectional plane. The leaf 50 and ring 56 are connected through the tab 62 and diverge away from one another. The leaves 50 project radially and axially from the tab 62. The arrangement of the exemplary embodiment allows to leaf 50 to absorb size changes in the gap 44 without deformation of the ring 56.

The plurality of leaves 50 and the ring 56 overlap one another along the center axis 52. The exemplary annular seal 46 thus seals a radial gap. However, alternative embodiments of the invention can be practiced to seal an axial gap (a gap along a center axis). In such embodiments, the leaves and ring could be positioned axially adjacent to one another.

As best shown in FIG. 5, the exemplary tabs 62 can be of variable width along the length defined between the base end 66 and the distal end 68. The width of the exemplary tab 62 is substantially constant over a majority of the length and narrowest adjacent to the ring 56. The narrowed portion of the tab 62 can enhance the flexibility of tabs 62 relative to the ring 56. For example, if the loading on the tab 62 induces bending of the tab 62 relative to the ring 56, the tab 62 could bend about the narrowed portion.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The right to claim elements and/or sub-combinations of the combinations disclosed herein is hereby reserved.

What is claimed is:

1. An annular seal positionable in a gap and comprising:
    a plurality of leaves positioned about a center axis wherein each leaf extends to a distal end that is elastically deflectable relative to said center axis to accommodate changes in a size of the gap;
    a ring encircling said center axis and at least partially interconnecting said plurality of leaves together for concurrent installation and removal; and
    a plurality of tabs projecting from said ring along said center axis, wherein each of said tabs is directly connected to at least one of said plurality of leaves such that elastic deformation of one of said plurality of leaves induces bending in said corresponding tab before inducing bending in said ring; and
    wherein each of said plurality of tabs extends a length between a base end adjacent to said ring and a distal end spaced from said base end and wherein said length of at least one of said plurality of tabs includes a first distance along the center axis and a second distance at least partially radial relative to the center axis; and
    wherein at least one of said plurality of leaves is fixed to said at least one of said plurality of tabs along at least part of said first distance and at least part of said second distance.

2. The annular seal of claim 1 wherein said one of said plurality of leaves is fixed to said at least one of said plurality of tabs along less than all of said first distance.

3. A turbine engine comprising:
    a first annular wall at least partially encircling a center axis;
    a second annular wall at least partially encircling said center axis and spaced from said first annular wall such that a gap is defined between said first and second annular walls;
    an annular seal having:
        a plurality of leaves positioned about said center axis wherein each leaf extends to a distal end that is elastically deflectable relative to said center axis to accommodate changes in a size of said gap;
        a ring encircling said center axis and at least partially interconnecting said plurality of leaves together for concurrent installation and removal; and
        a plurality of tabs projecting from said ring along said center axis and each of said plurality of tabs are circumferentially spaced from one another about said center axis, wherein each of said tabs is directly connected to at least one of said plurality of leaves such that elastic deformation of one of said plurality of leaves induces bending in said corresponding tab before inducing bending in said ring; and
    wherein said ring and said plurality of tabs extend flush against said first annular wall and wherein each of said plurality of leaves project radially and axially from one of said plurality of tabs.

4. A turbine engine comprising:
    a first annular wall at least partially encircling a center axis;
    a second annular wall at least partially encircling said center axis and spaced from said first annular wall such that a gap is defined between said first and second annular walls;
    an annular seal having:
        a plurality of leaves positioned about said center axis wherein each leaf extends to a distal end that is elastically deflectable relative to said center axis to accommodate changes in a size of said gap;
        a ring encircling said center axis and at least partially interconnecting said plurality of leaves together for concurrent installation and removal; and
        a plurality of tabs projecting from said ring along said center axis and each of said plurality of tabs are circumferentially spaced from one another about said center axis, wherein each of said tabs is directly connected to at least one of said plurality of leaves such that elastic deformation of one of said plurality of leaves induces bending in said corresponding tab before inducing bending in said ring; and wherein said ring and said plurality of tabs directly contact said first annular wall and said plurality of leaves directly contact said second annular wall.

* * * * *